United States Patent [19]

Green et al.

[11] Patent Number: 5,959,294
[45] Date of Patent: Sep. 28, 1999

[54] METHOD AND APPARATUS FOR INTERROGATION OF FIBER OPTIC INTERFEROMETRIC SENSORS IN MULTI-CHANNEL APPLICATIONS

[75] Inventors: James D. Green, Newbury Park; Eugene L. Ferraro, Simi Valley; Lawrence J. Hershman, Winnetka, all of Calif.

[73] Assignee: Litton Systems, Inc., Woodland Hills, Calif.

[21] Appl. No.: 09/021,014

[22] Filed: Feb. 10, 1998

[51] Int. Cl.$^6$ .......................................... G01B 9/02
[52] U.S. Cl. ...................................... 250/227.27; 356/345
[58] Field of Search ..................... 250/227.27, 227.19, 250/214 R, 227.11; 356/345, 351

[56] References Cited

U.S. PATENT DOCUMENTS

| | | | |
|---|---|---|---|
| 4,649,529 | 3/1987 | Avicola | 356/345 |
| 4,752,132 | 6/1988 | Pavlath | 356/345 |
| 5,448,058 | 9/1995 | Arab-Sadeghabadi et al. | |
| 5,555,086 | 9/1996 | VonBieren et al. | 250/227.27 |

OTHER PUBLICATIONS

Homodyne Demodulation Scheme for Fiber Optic Sensors Using Phase Generated Carrier, Anthony Dandridge, Alan B. Tveten and Thomas G. Gaillorenzi, IEEE Journal of Quantum Electronics, vol. QE–18, Oct. 1982.

TMC2330A Coordinate Transformer 16 X 16 Bit, 50 MOPS, Raytheon Electronics Semiconductor Division, Stock# /ds7002330A, Jun. 1997.
GC40414 Quad Receiver Chip Datasheet, Gray chip, Inc., Graychip DSP Chips and Systems, Dec. 1, 1997.

*Primary Examiner*—Edward P. Westin
*Assistant Examiner*—Kevin Pyo
*Attorney, Agent, or Firm*—Price Gess & Ubell

[57] ABSTRACT

A technique for interrogation of fiber optic interferometric sensors wherein an optical signal is modulated by an array of fiber optic sensors in response to acoustic pressure. Modulated signals (channels) from each sensor are multiplexed onto a single fiber optic cable and the multiplexed signal is input to a polarization diversity detector having at least two outputs. The optical signal is converted into a digital, electrical signal. A plurality of digital down converters demultiplex and demodulate the separate channels and output in-phase data and quadrature phase data for each of the signal channels. A system controller connects to the digital down converters and to a calibration digital down converter. The calibration digital down converter, controlled by the system controller, mimics an operation of each digital down converter in turn in order to determine optimal digital down converter settings for each digital down converter. The system controller updates the optimal settings for each digital down converter such that the digital down converters are dynamically calibrated according to the optimal settings. The in-phase and quadrature phase data output of the digital down converters are then processed with an acoustic signal processor.

20 Claims, 8 Drawing Sheets

METHOD AND APPARATUS FOR INTERROGATION OF FIBER OPTIC INTERFEROMETRIC SENSORS IN MULTI-CHANNEL APPLICATIONS

BACKGROUND OF THE INVENTION

1. Field of the Invention

The present invention relates generally to the field of signal processing, and more specifically to a method and apparatus for interrogation of fiber optic interferometric sensors in multi-channel applications.

2. Description of Related Art

The present invention is related to a separate application, Ser. No. 09/021,557, entitled "METHOD AND APPARATUS FOR CALIBRATION OF DIGITAL DOWN CONVERTERS IN A SIGNAL PROCESSING SYSTEM," assigned to the assignee of the present invention.

Acoustic listening systems for underwater applications are well known in the art. For example, modern military submarines are equipped with arrays of acoustic sensors which provide sensitive underwater listening capabilities and even relative position information. Each sensor reacts to an incoming pressure wave by modulating an input signal and the outputs of all the sensors are processed to determine the sound and position information. These sensor arrays are generally either attached to the submarine hull or are towed behind the submarine. Ideally, the sensors would be attached to the submarine hull, but prior art acoustic sensors were simply too heavy for many submarine applications. Recent advances in acoustic sensor array technology, however, have produced arrays which are light enough to be mounted on a submarine hull and which still provide very sensitive signal response. This weight reduction has also allowed the number of sensors to be increased.

Another application for underwater acoustic sensors is in the geological survey industry, specifically, for underwater oil exploration. Vast arrays of sensors may be placed on the ocean bottom in the vicinity of known oil reserves. A surface ship then initiates an acoustic pressure wave (i.e. a large air burst). The acoustic pressure wave and its reflection off the ocean floor are detected by the sensor arrays. The data from the sensors is then processed and analyzed to determine optimum drilling locations or to monitor the status of known reservoirs.

As the number and complexity of the acoustic sensors in these and related applications have increased, the associated signal processing electronics have likewise increased. Prior art systems use analog circuitry to interrogate the sensors, but these analog systems are subject to drift and are very difficult to accurately calibrate. Also, recent developments have provided fiber optic interferometric sensors which provide unique signal processing problems (see "Homodyne Demodulation Scheme for Fiber Optic Sensors Using Phase Generated Carrier" by Anthony Dandridge, Alan B. Tveten, and Thomas G. Giallorenzi, IEEE Journal of Quantum Electronics, Vol. QE-18, No. 10, Oct. 1982, herein incorporated by reference). Note that this reference teaches a modulation/demodulation technique in which the I and Q frequencies are different. This technique is employed in the present invention. Thus, there is a need for a signal processing system which overcomes the shortcomings of the analog systems and can be used with fiber optic interferometic sensor arrays.

OBJECTS AND SUMMARY OF THE INVENTION

It is thus an object of the present invention to provide an apparatus and method for interrogating fiber optic interferometric sensors which overcomes the deficiencies of the prior art.

It is another object of the present invention to provide a digital signal processing system which is not subject to the problems of the prior art analog systems.

It is yet another object of the present invention to provide an acoustical signal processing system which is easier to calibrate and less susceptible to drift than the prior art analog systems.

These and other objects of the present invention may be met by an acoustic signal processing system comprising a laser means for providing an input optical signal to an array of fiber optic interferometric sensors, which are responsive to acoustic pressure waves and wherein each sensor modulates the input optical signal in accordance with a detected acoustic pressure wave. A multiplexing means multiplexes the modulated input optical signals output by the sensors onto a single line (or several lines). The output signal is first processed by a polarization diversity detector having at least two outputs. Photo-diodes connected to the outputs of the polarization diversity detector convert the optical signal into an electrical current. Opto-receivers convert the electrical current to a voltage and analog-to-digital converters convert the analog signals to digital signals.

A bus switch connects the digital signals to a plurality of digital down converters. Each digital down converter corresponds to one of the plurality of signal frequencies, wherein each digital down converter is connected to each signal path and each digital down converter outputs in-phase data and quadrature phase data corresponding to one of the plurality of signal frequencies. The data output by the digital down converters are then processed further by signal processing blocks.

A system controller connects to the digital down converters and to the bus switch. A calibration digital down converter, controlled by the system controller, mimics an operation of each digital down converter in turn in order to determine optimal digital down converter settings for each digital down converter. The system controller updates the determined optimal settings for each digital down converter such that the digital down converters are calibrated according to the optimal settings.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a technique for interrogation of fiber optic interferometric sensors in multi-channel applications.

Figure 1A:
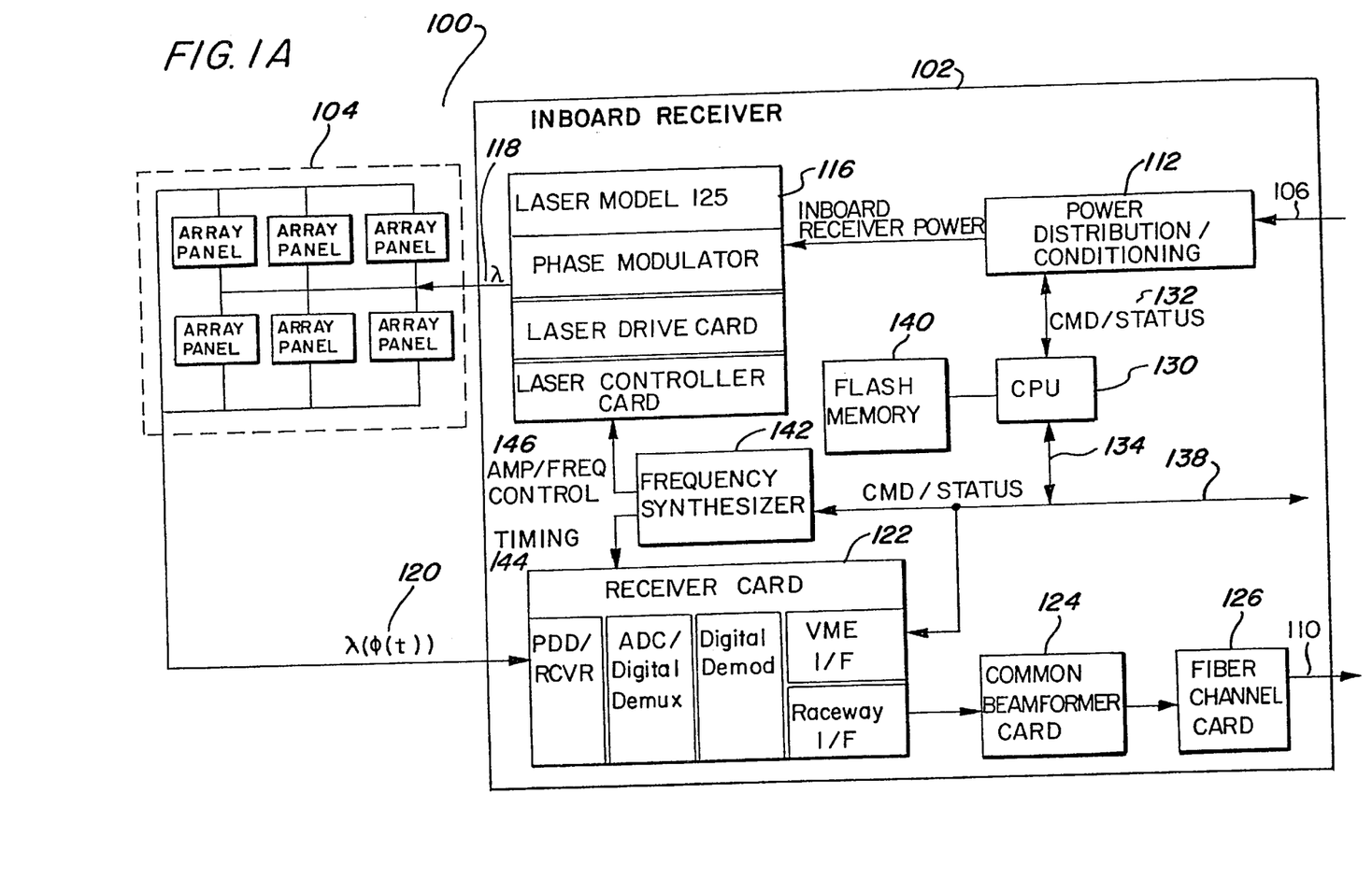
FIG. 1(A) is a high-level block diagram of a submarine system incorporating the present invention.

FIG. 1(A) is a high-level block diagram of a submarine system 100 incorporating the present invention. An inboard receiver module 102 contains the requisite electronic control and processing circuitry and is located inside the submarine. A light weight array of fiber optic interferometric sensors 104 is located on the hull (i.e operates in the water) of the submarine. Each sensor reacts to an incoming acoustic pressure wave by modulating a light signal 118 sent from the inboard receiver 102. Modulated signals from different sensors (each operating at a different carrier frequency) are passively multiplexed onto a single fiber optic cable and sent back to the receiver. The channel signals are then demultiplexed and demodulated by the receiver 102.

The inboard receiver 102 is connected to the submarine's power system via a power connection 106. The inboard receiver 102 has a power distribution and conditioning block 112 to provide the necessary power requirements for the receiver components. The input light signal 118 is generated by a laser module 116. The laser module includes a laser, a phase modulator, a laser driver card and a laser controller card. The laser used in the preferred embodiment is a Model 125 200 mW Nd:YAG laser available from Lightwave Electronics of Palo Alto, Calif.

Figure 1B:
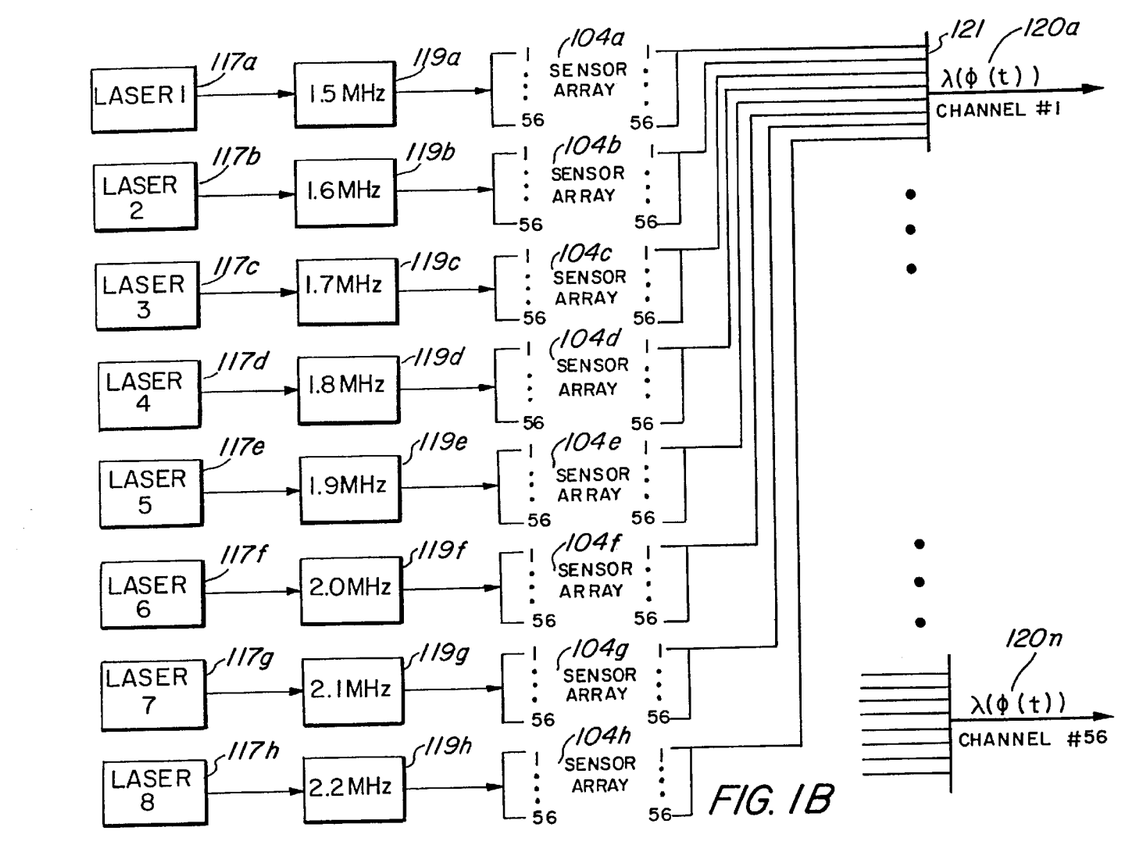
FIG. 1(B) is a block diagram illustrating a preferred configuration for the laser modules driving the sensor arrays.

As shown in FIG. 1(B), the preferred embodiment uses eight lasers 117a–117h which drive eight corresponding sensor arrays 104a–104h. Each laser powers 56 sensors (channels), 28 channels on each side of the submarine. Each laser is modulated by a phase modulator 119a–119h injecting a sine wave signal. Each phase modulator 119a–119h injects a different frequency sine wave [1.5 MHz to 2.2 MHz in the preferred embodiment]. Each laser's wavelength is nominally at 1319 nanometers, but each laser operates at a different "color" around 1319 nanometers. The frequency synthesizer 142 controls the temperature of each laser separately, as is well known in the art, in order to produce eight different "colors." The first channels from each sensor array are multiplexed via a signal multiplexor 121. This a total of 56 fiber optic cables return from the sensor array 104, with each fiber carrying eight multiplexed signals. This multiplexed signal is then processed by a receiver card 122. Depending upon the number of sensors used, several receiver cards may be needed.

The frequency synthesizer 142 contains the master system clock and controls the operation of the laser module, specifically, such parameters as laser color, power, temperature monitoring, etc. Timing information is provided to the receiver card via a signal line 144. A CPU 130 and associated memory 140 provide system level control and status information to the other receiver 102 components via data lines 132, 134, 138. The CPU 130 also controls a "gross" calibration procedure for the laser modules, a detailed description of which is beyond the scope of the present invention.

The receiver card 122 demultiplexes and demodulates the return signal 120 and outputs a signal to a common beamformer card 124 which provides additional signal processing. A fiber channel card 126 provides the signal information to an external fiber bus 110. In the preferred embodiment, each receiver card 122 processes the signals from 7 return fibers, or a total of 56 channels.

Figure 2:
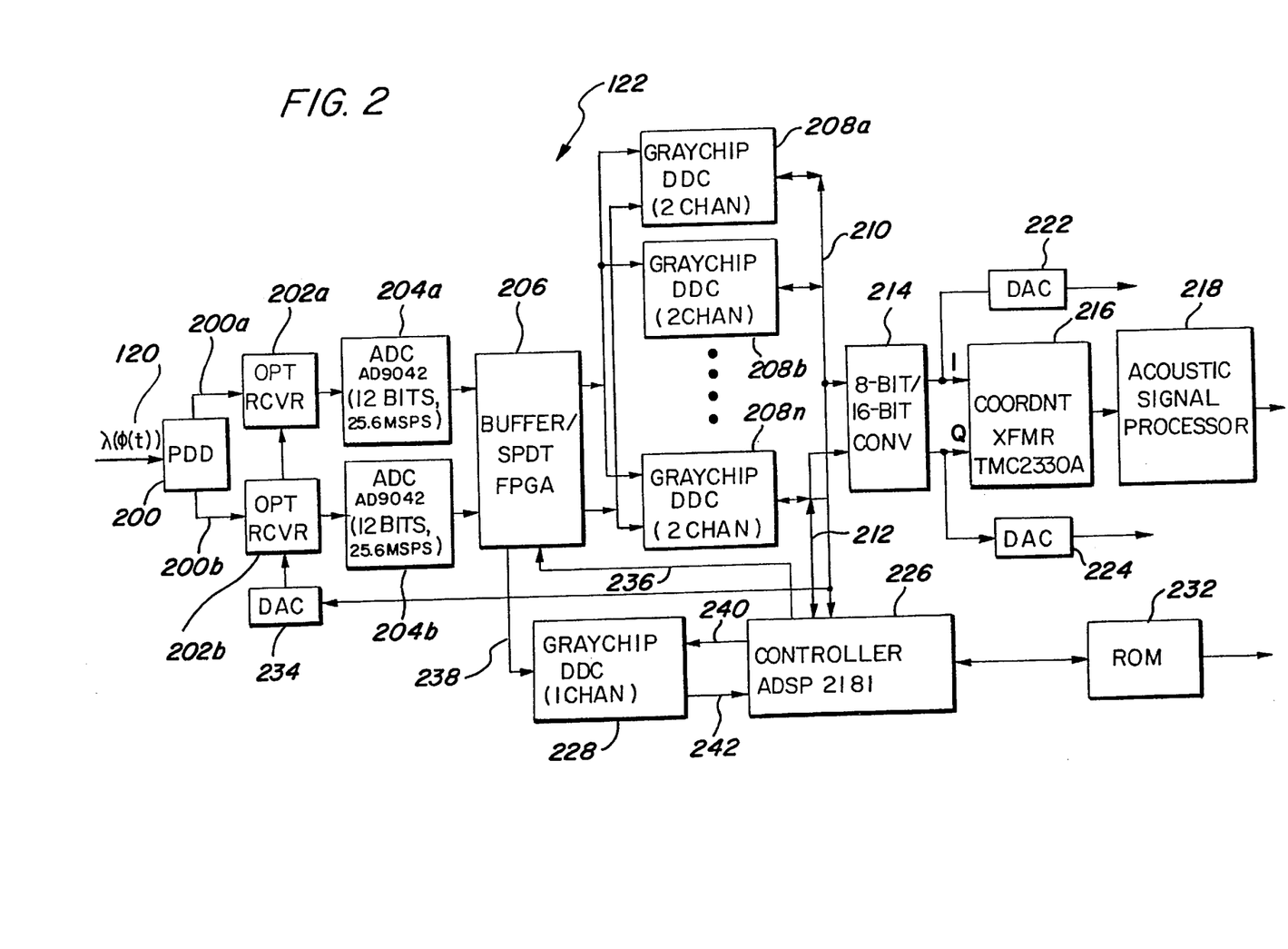
FIG. 2 is a hardware block diagram of the present invention.

FIG. 2 is a detailed block diagram of the receiver card 122 shown in FIG. 1. The signal $\lambda(\phi(t))$ 120 (containing 8 channels) output by the acoustic sensor array is input to a polarization diversity detector (PDD) 200. An example of a PDD which has three outputs is described in U.S. Pat. No. 5,448,058, entitled "OPTICAL SIGNAL DETECTION APPARATUS AND METHOD FOR PREVENTING POLARIZATION SIGNAL FADING IN OPTICAL FIBER INTERFEROMETRIC SENSOR SYSTEMS." In the preferred embodiment, a bi-cell or two output PDD is used. The PDD 200 prevents polarization signal fading in the return signal 120. The PDD 200 converts the photonic energy of the return optical fiber signal 120 into two separate electrical currents 200a, 200b via two photodiodes (not shown). In each opto-receiver 202a, 202b, a transimpedance amplifier converts the input current to a voltage. A variable gain amplifier sets the voltage level to maximize the signal-to-noise level and to ensure that the voltage level is below the saturation level of the ADCs 204a, 204b. Anti-aliasing filters in the opto-receivers 202a, 202b filter the signal which then passes to the ADCs 204a, 204b. A digital-to-analog converter (DAC) 234 creates a gain value from a digital gain value output by the system controller 226 for each variable gain amplifier in each opto-receiver 202a, 202b.

The analog outputs of the opto-receivers 202a, 202b are then digitized by high speed (>25.6 MSPS), high resolution (>12-bit) analog-to-digital converters (ADCs) 204a, 204b. The ADC used in the preferred embodiment is part number 9042, manufactured by Analog Devices, Inc. The number of ADCs used is directly dependent upon the number of outputs from the PDD 200. Typically, there are two outputs, but three is possible. At this point, the digitized output contains a complex signal comprised of all channels of the frequency division multiplexed phase generated carriers with their information carrying sidebands on the return optical fiber signal 120.

Each ADC 204a, 204b output is buffered and passed through to a multi-throw, multi-pole bus switch 206 which taps into each ADC 204a, 204b signal path. One output of the bus switch 206 goes to a digital down converter (DDC) 228, via signal path 238, which is employed as part of a calibration channel, as described below. The outputs of the bus switch 206 go to the signal channel DDCs 208a, 208b, 208n. The purpose of the bus switch 206 is to allow each of the DDCs to be able to connect to any ADC output. This is required by the PDD selection algorithm, discussed below with reference to FIG. 6.

Each DDC 208a, 208b, 208n acts as a digital demultiplexer by performing mix down and filtering of the digital information, separating one channel out of the composite signal. The DDC chip employed in the presently preferred embodiment is the GC4014 chip manufactured by Graychip, Inc. This particular device has 2 channel capability. In other embodiments, each chip may only have ½ channel capability. The number of DDCs needed depends upon the number of channels used in a given application. For example, if the input signal 120 has 8 multiplexed channels, then 4 DDC chips are needed. In the present embodiment, 28 DDCs (56 channels) are used per receiver card 122, but only one calibration DDC and system controller are required (as described below). Thus, seven channel groups are needed to process all 56 multiplexed signals (8 channels per multiplexed array output signal).

Each DDC 208a, 208b, 208n outputs both in-phase (I) and quadrature phase (Q) words that represent the rectangular components of the phase. These I and Q components from the DDCs 208a, 208b, 208n are time division multiplexed (TDM) onto separate I and Q buses. The output signal paths 210, 212 (which are serial, unidirectional data paths in the preferred embodiment) output the I and Q 8-bit words to a buffer 214 which buffers the words and also converts the 8 bit words into 16 bit words.

The I and Q words are demodulated from all of the DDCs in a time sequence. The I and Q words are converted from Cartesian to polar form by the coordinate transformer 216. The coordinate transformer 216 of the preferred embodiment is a TMC2330A chip manufactured by Raytheon Corp., but may be any similar device. The output of the coordinate transformer 216 is the instantaneous phase angle, whose change is directly related to the change in acoustic pressure of the acoustic signal from the environment and whose rate of change is directly related to the frequency of the acoustic signal from the environment for a given fiber optic sensor. The channel-by-channel instantaneous phase angles are further processed in an acoustic signal processor 218 with integration and filtering algorithms. The output of the acoustic signal processor 218 may then be provided to a visual display or further signal processing blocks, as desired. Two DACs 222, 224 provide I and Q signals which can be used for testing or viewing the output signal. For example, the I and Q signals may be connected to the X and Y inputs of an oscilloscope in order to view a graphical representation of the I and Q signals.

The operation of the calibration procedure will now be described. The output 238 of the bus switch 206 feeds the calibration channel DDC 228. If there is more than one PDD 200, there will be more than one bus switch 206 feeding the calibration channel DDC 228 in a TDM manner. The calibration channel DDC 228 is set to mimic each signal channel in turn. The calibration channel provides a way to check PDD output selection, phase shift adjustment and I/Q balance on a per signal channel basis in a non-obtrusive way. The data is processed by the DDC 228 into I and Q words similar to the signal channel DDCs 208a, 208b, 208n. The I and Q words are processed by the system controller 226 to extract the information necessary to determine channel performance. The system controller 226 of the preferred embodiment is a ADSP 2181 manufactured by Analog Devices, Inc.

Figure 3:
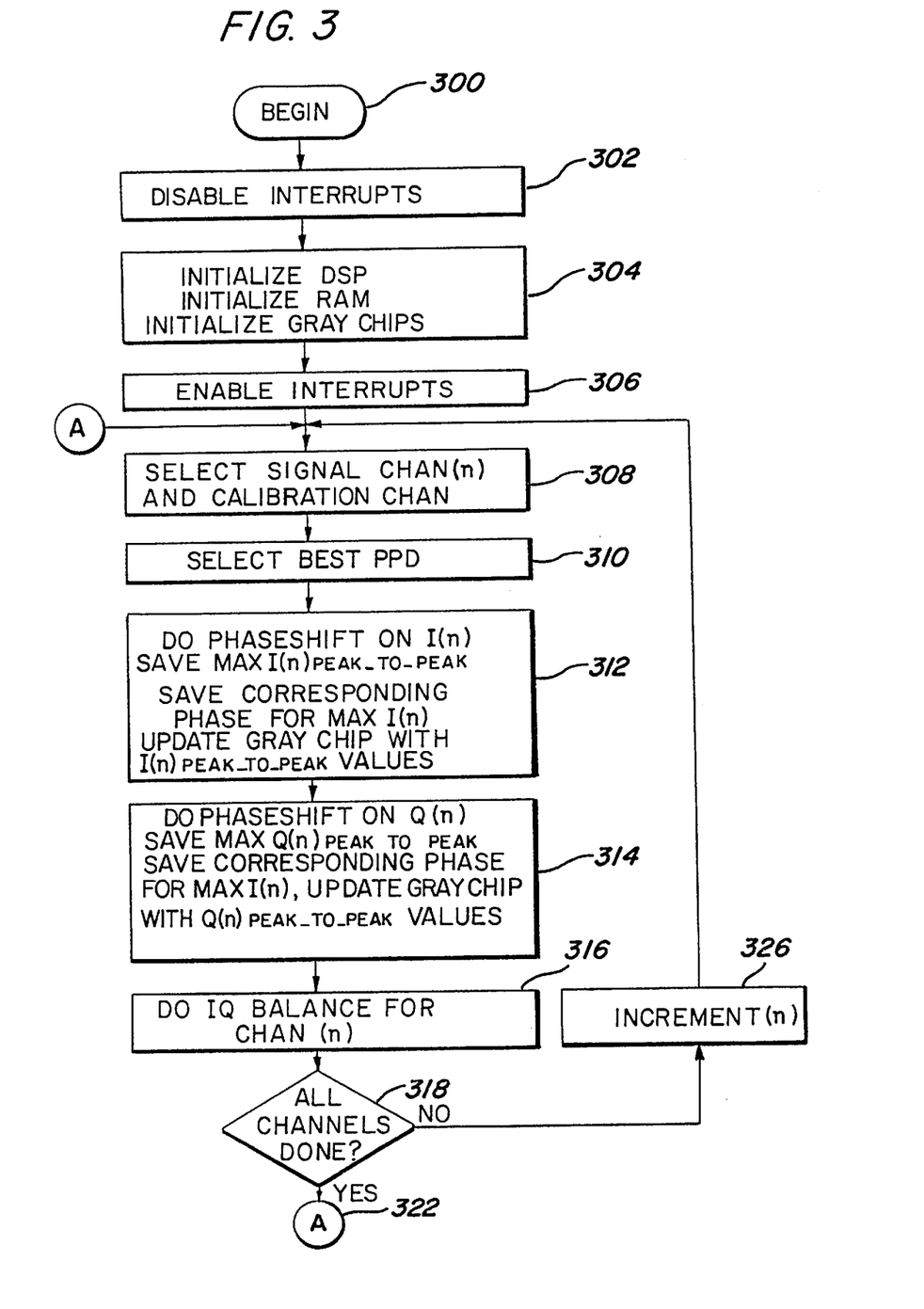
FIG. 3 is a flowchart illustrating the operation of the system controller of the present invention.

The operation of the system controller 226 will now be described with reference to the flowchart of FIG. 3. The following steps are performed by software which is stored in the system controller's ROM 232 or the code may be downloaded by the system CPU 130 to a RAM upon system initialization. Upon power initialization or a system re-initialization 300, all interrupts are disabled at step 302. The digital signal processing (DSP) is initialized, along with any associated RAM memory and the DDCs at step 304. The interrupts are then enabled at step 306. A signal channel and a calibration channel are selected at step 308. Then, the best PDD signal is selected at step 310. This PDD selection step is further described below with reference to FIG. 6. A phase shift algorithm for the I component is performed at step 312, which is shown in detail in FIG. 4. Similarly, a phase shift algorithm for the Q component is performed at step 314, as shown in FIG. 5. An I/Q balance algorithm is executed at step 316, which is shown in detail in FIG. 7. Steps 308–316 are repeated for each channel, until all the channels have been calibrated. In one embodiment, calibration is performed only at system start-up. In the preferred embodiment, however, the calibration procedure continues for each DDC for as long as the system is operating. This results in a dynamic calibration system which unobtrusively calibrates the system, while signal processing functions are unaffected.

Figure 6:
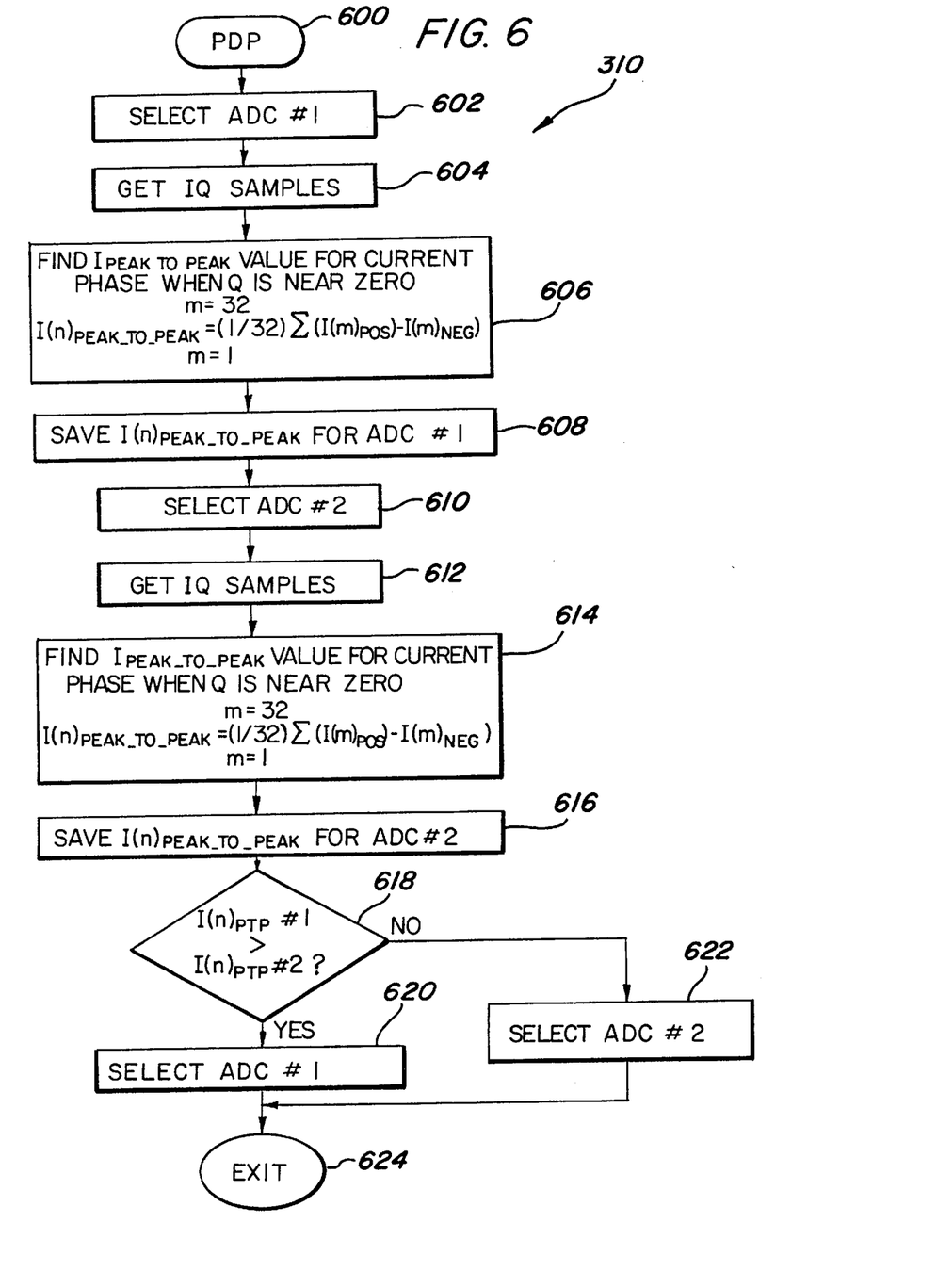
FIG. 6 is a flowchart illustrating the functional flow of the polarization diversity detector (PDD) selection procedure.

The procedure for selecting the best PDD signal (step 310) is illustrated by the flowchart of FIG. 6. At step 602, the first ADC 204a is selected, and I and Q data samples are obtained at step 604. A maximum $I_{peak-to-peak}$ value is calculated at step 606. The maximum $I_{peak-to-peak}$ value determined at step 606 is then stored at step 608. Then the second ADC 204b is selected at step 610. I and Q data samples are then obtained for the second ADC 204b at step 612. Again, a maximum $I_{peak-to-peak}$ value is calculated at step 614, and this value is stored at step 616. The two stored maximum $I_{peak-to-peak}$ values are then compared at step 618. The ADC which produces the larger $I_{peak-to-peak}$ value is then selected (steps 620, 622). Since selecting different ADCs will affect the I and Q signal levels symmetrically, only one signal (I or Q) needs to be examined. Note that the PDD selection step is performed for each channel separately. Thus, different DDC may actually be using different ADC inputs, which is why each DDC needs to be connected to both ADCs.

Figure 4:
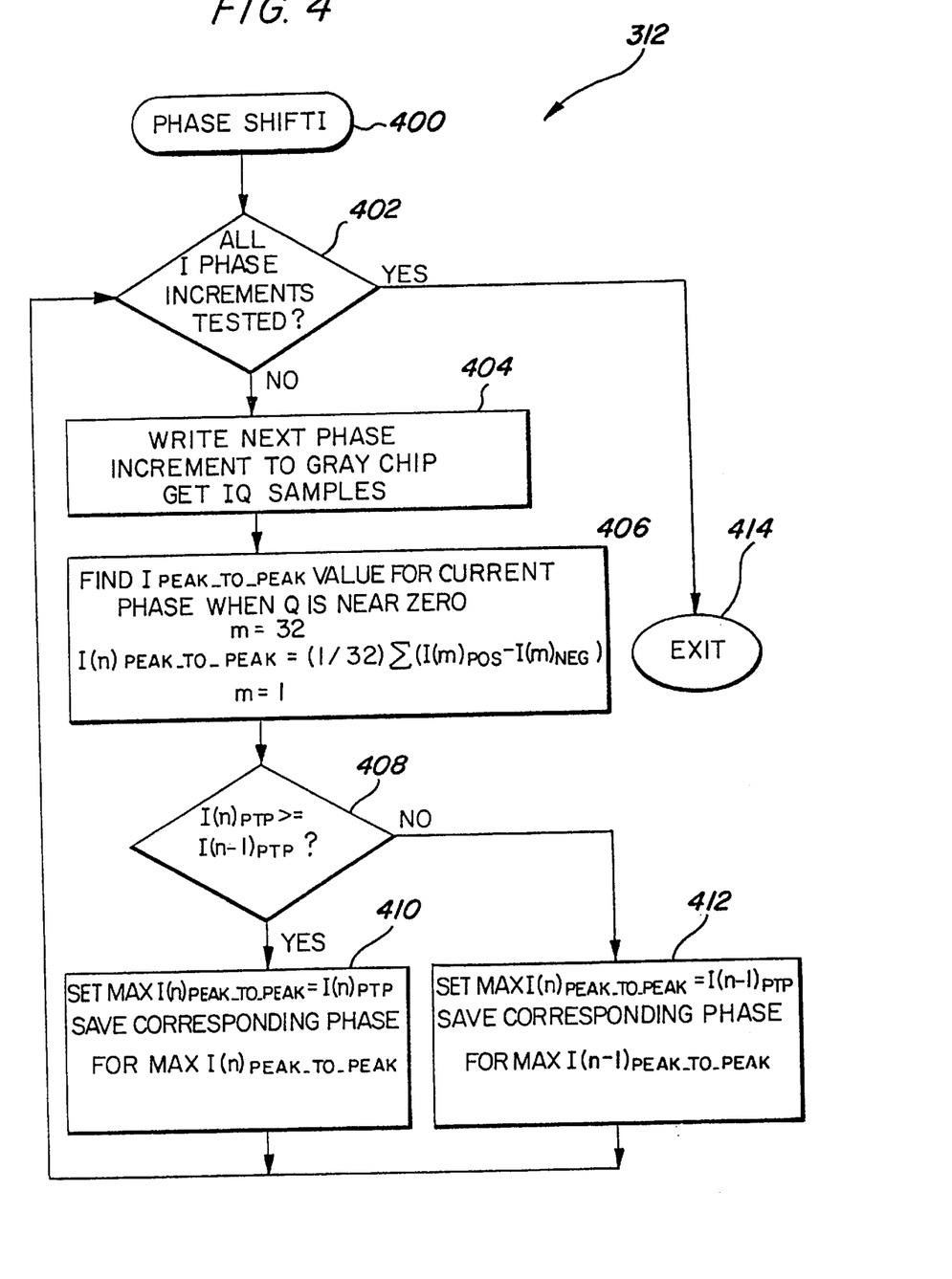
FIG. 4 is flowchart illustrating the phase shift algorithm for the in-phase signal (I data)
Figure 5:
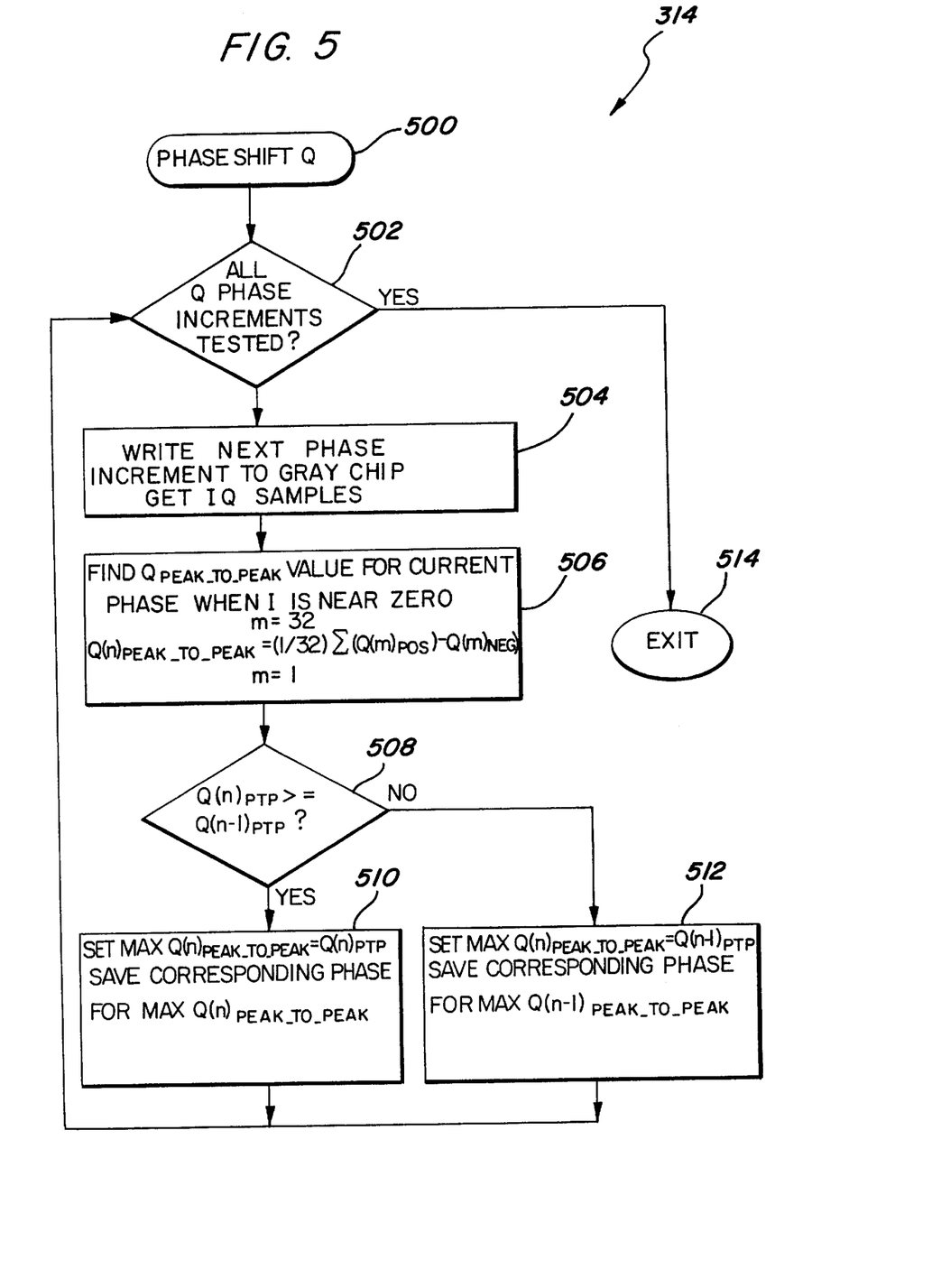
FIG. 5 is a flowchart illustrating the phase shift algorithm for the quadrature phase signal (Q data)

The phase shift algorithm for the I component (step 312) and the Q component (step 314) are shown in FIGS. 4 and 5, respectively. The purpose of this algorithm is to determine the phase offsets that result in a maximum phase signal (I data) and quadrature phase signal (Q data) for each channel. This is accomplished by programming the calibration DDC's 228 channel control registers with different phase offsets having equal phase increments and reading the corresponding I and Q data from the channel output registers. The I and Q data generated by the calibration DDC 228 will be read by the system controller 226 and stored into two separate buffers. Once a sufficient number of data samples have accumulated, the phase shift algorithm will be performed on the I and Q data. The output of the phase shift algorithms will generate an I-phase offset and a Q-phase offset, which are the offsets that result in maximum amplitude I and Q signals. These optimal offset values will then be stored in the associated signal channel DDC.

At step 404 a phase increment is stored in the calibration DDC 228, and the I and Q data values are obtained. At step 406, a maximum peak-to-peak value for I is calculated. In the present embodiment 32 samples are used, but depending upon the application, either more or less samples may be used. If the I value calculated at step 406 is greater to or equal to a previous value, then a MAX $I(n)_{peak-to-peak}$ variable is set equal to the current I value, and the corresponding phase is also saved at step 410. Otherwise, at step 412, the MAX I(n) variable is set equal to the previous value of I, and the corresponding phase value is saved. This procedure is repeated at step 402 until all I phase increments have been tested. The resulting MAX I(n) value is then stored into the corresponding DDC chip associated with the current channel.

The procedure for determining the Q phase shift value is exactly the same as the procedure for determining the I phase shift value, as shown in FIG. 5, and a detailed analysis of the flowchart will not be repeated.

Figure 7:
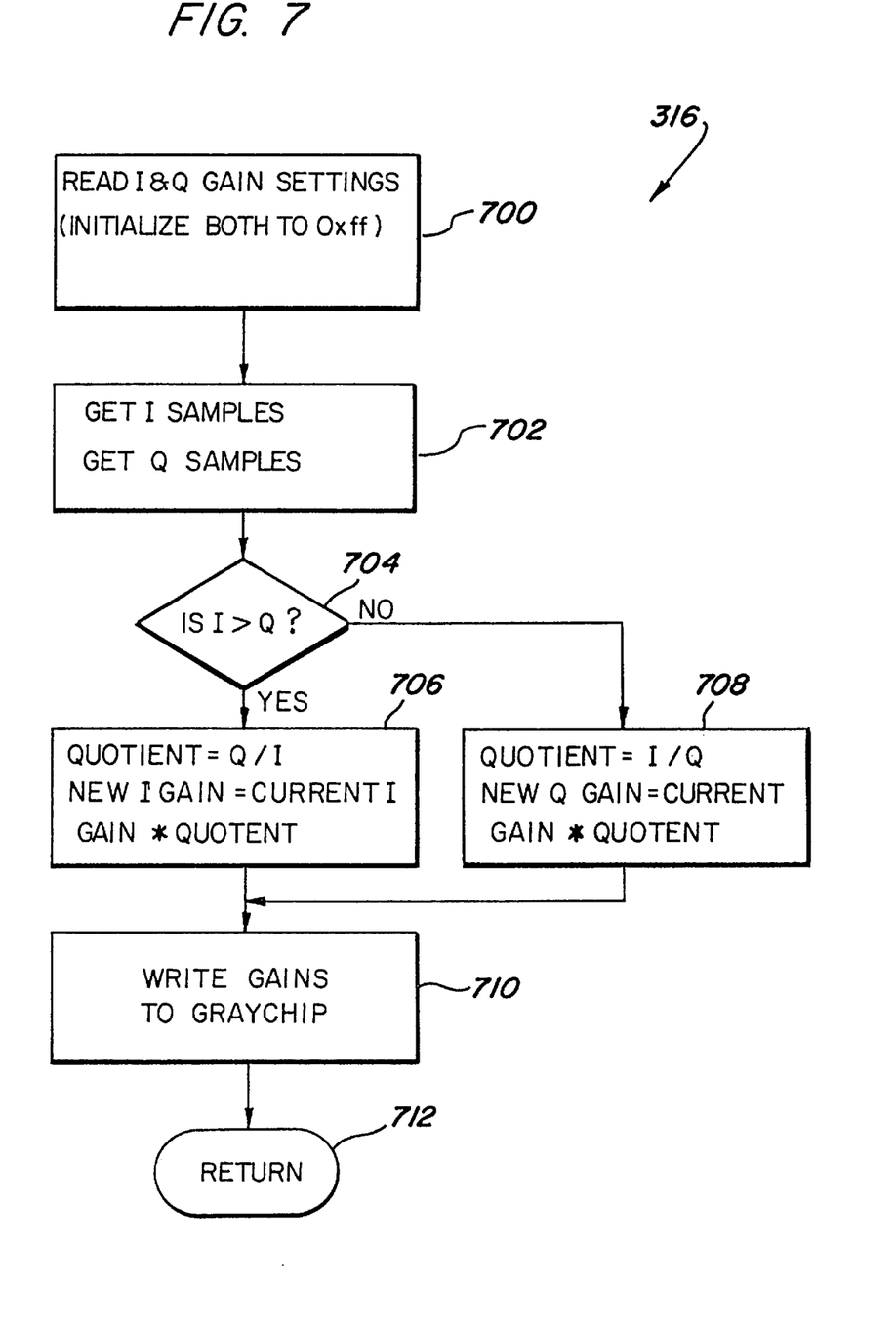
FIG. 7 is a flowchart illustrating the I/Q balance algorithm.

FIG. 7 is a flowchart illustrating the I/Q balance algorithm (step 316 of FIG. 1). This procedure is necessary in order to normalize the maximum I and Q vectors in order to minimize the errors in angle calculations. At step 700, the current I and Q gain settings for the current signal channel are read and the I and Q data samples are obtained for the current channel. At step 704, the I and Q values are compared. If I is greater than Q, then a new I gain is calculated at step 706. The new I gain value is equal to the current I gain value multiplied by the quotient [Q/I]. If, however, I is not greater than Q, then a new Q gain value is calculated at step 708. The new Q gain value is equal to the current Q gain value multiplied by the quotient [I/Q]. The gain values are then re-written to the DDC of the current signal channel.

In the preferred embodiment, the control signal bus and the data bus for the DDCs are separate. The control signal path between the DDCs and the system controller is a separate bi-directional parallel bus. The data signals are output onto a separate serial bus. By using different buses to move data into and out of the DDCs, the background calibration operations are processed in parallel to the high speed signal data process flow. As a result, both high speed signal processing and background calibration processing can occur at the same time. In a second embodiment, both signal and control information share the same parallel bus, and, due to throughput limitations on the bus, the calibration routines are run only during startup or when there is a break in normal system operations.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A signal processing system for processing an optical signal containing a plurality of multiplexed signal channels, the system comprising:

a polarization diversity detector having at least two outputs;

a plurality of photo-diodes, wherein each photo-diode is connected to one output of the polarization diversity detector, thereby forming at least two signal paths;

a plurality of opto-receivers, wherein each opto-receiver is connected to one photodiode;

a plurality of analog-to-digital converters, wherein each analog-to-digital converter is connected to one opto-receiver;

a bus switch connected to an output of each analog-to-digital converter;

one or more digital down converters connected to the bus switch, each digital down converter corresponding to one of the plurality of signal channels, wherein each digital down converter is connected to each signal path and each digital down converter outputs in-phase data and quadrature phase data corresponding to one of the plurality of signal channels;

a system controller connected to the digital down converters and to the bus switch;

a calibration digital down converter connected to the system controller and the bus switch; and a signal processor for processing the in-phase data and the quadrature phase data output by each digital down converter;

wherein the calibration digital down converter, controlled by the system controller, mimics an operation of each digital down converter in turn in order to determine optimal digital down converter settings for each digital down converter, and the system controller updates the determined optimal settings for each digital down converter such that the digital down converters are calibrated according to the optimal settings.

2. The signal processing system of claim 1, wherein the system controller and the digital down converters are connected via a single signal and control bus, such that the digital down converter calibration is performed only at system start-up or during prescribed time slots in normal system operation.

3. The signal processing system of claim 1, wherein the system controller and the digital down converters are connected via separate signal and control buses, such that both signal processing and calibration are performed simultaneously and the optimal settings are updated dynamically for each channel without adversely affecting signal processing.

4. The signal processing system of claim 3, further comprising a buffer connected to the analog-to-digital converters for buffering a digital output signal for each data path.

5. The signal processing system of claim 4, wherein the opto-receiver further comprises:

a transimpedance amplifier which converts a current signal produced by the photodiode into a voltage signal;

a variable gain amplifier connected to an output of the transimpedance amplifier; and an anti-aliasing filter for filtering an output of the variable gain amplifier.

6. The signal processing system of claim 5, further comprising a first digital-to-analog converter connected between the system controller and each opto-receiver, wherein the first digital-to-analog converter converts a digital gain value output by the system controller to an analog value for adjusting the gain of each variable gain amplifier.

7. The signal processing system of claim 6, further comprising a coordinate transformer for converting the in-phase and quadrature phase data from Cartesian to polar form.

8. The signal processing system of claim 7, further comprising a memory connected to the system controller for storing a system calibration routine executed by the system controller.

9. The signal processing system of claim 8, further comprising an 8-bit to 16-bit converter connected between the digital down converters and the coordinate transformer.

10. The signal processing system of claim 9, further comprising a second digital-to-analog converter connected to an in-phase data output of the 8-bit to 16-bit converter and a third digital-to-analog converter connected to a quadrature data output.

11. The signal processing system of claim 3, wherein the polarization diversity detector has two outputs.

12. An acoustic signal processing system for interrogating an array of fiber optic interferometric sensors, the system comprising:

a laser means for providing an input optical signal;

an array of fiber optic interferometric sensors which are responsive to acoustic pressure waves and wherein each sensor modulates the input optical signal in accordance with a detected acoustic pressure wave;

multiplexing means for multiplexing the modulated input optical signals output by the sensors onto a single line, each signal at a different frequency (channel);

a polarization diversity detector having at least two outputs;

a plurality of photo-diodes, wherein each photo-diode is connected to one output of the polarization diversity detector, thereby forming at least two signal paths;

a plurality of opto-receivers, wherein each opto-receiver is connected to one photodiode;

a plurality of analog-to-digital converters, wherein each analog-to-digital converter is connected to one opto-receiver;

a bus switch connected to an output of each analog-to-digital converter;

a plurality of digital down converters connected to the bus switch, each digital down converter corresponding to one of the plurality of signal frequencies, wherein each digital down converter is connected to each signal path and each digital down converter outputs in-phase data and quadrature phase data corresponding to one of the plurality of signal frequencies;

a system controller connected to the digital down converters and to the bus switch;

a calibration digital down converter connected to the system controller and the bus switch; and a signal processor for processing the in-phase data and the quadrature phase data output by each digital down converter;

wherein the calibration digital down converter, controlled by the system controller, mimics an operation of each digital down converter in turn in order to determine optimal digital down converter settings for each digital down converter, and the system controller updates the determined optimal settings for each digital down converter such that the digital down converters are calibrated according to the optimal settings.

13. The acoustic signal processing system of claim 12, wherein the system controller and the digital down converters are connected via separate signal and control buses, such that both signal processing and calibration are performed simultaneously and the optimal settings are updated dynamically for each channel without adversely affecting signal processing.

14. The acoustic signal processing system of claim 13, wherein the opto-receiver further comprises:

a transimpedance amplifier which converts a current signal produced by the photodiode into a voltage signal;

a variable gain amplifier connected to an output of the transimpedance amplifier; and an anti-aliasing filter for filtering an output of the variable gain amplifier.

15. The acoustic signal processing system of claim 14, further comprising a first digital-to-analog converter connected between the system controller and each opto-receiver, wherein the first digital-to-analog converter converts a digital gain value output by the system controller to an analog value for adjusting the gain of each variable gain amplifier.

16. The acoustic signal processing system of claim 15, further comprising a coordinate transformer for converting the in-phase and quadrature phase data from Cartesian to polar form and an acoustic signal processor for processing the polar data output by the coordinate transformer.

17. The acoustic signal processing system of claim 12, wherein the optimal settings include a best polarization diversity detector path, a best in-phase phase value, a best quadrature phase value, and a normalized in-phase and quadrature phase gain value for each channel.

18. The acoustic signal processing system of claim 17, wherein the array of fiber optic interferometric sensors are mounted on a submarine hull.

19. The acoustic signal processing system of claim 17, wherein the array of fiber optic interfermetric sensors are located on a sea floor and an acoustic pressure wave is sent from a surface ship in order to determine geological information concerning the sea floor.

20. A method for interrogating an array of fiber optic interferometric sensors comprising the steps of:

providing an input optical signal to the array;

multiplexing modulated input optical signals output by the sensors in response to an acoustic pressure wave onto a single line, each signal at a different frequency (channel);

inputting the multiplexed signal into a polarization diversity detector having at least two outputs;

converting the photonic energy of each polarization diversity detector output into an electrical current;

converting each electrical current into a voltage;

converting each analog signal into a digital signal;

providing each digital signal to a plurality of digital down converters;

processing the digital signals with the plurality of digital down converters, such that each digital down converter corresponds to one of the plurality of signal frequencies, wherein each digital down converter is connected to each signal path and each digital down converter outputs in-phase data and quadrature phase data corresponding to one of the plurality of signal frequencies;

calibrating the digital down converters by mimicking an operation of each digital down converter in turn in order to determine optimal digital down converter settings for each digital down converter;

updating each digital down converter with the determined optimal settings; and processing the in-phase data and the quadrature phase data output by each digital down converter with an acoustic signal processor.

* * * * *